(12) United States Patent
Tiihonen

(10) Patent No.: US 12,180,082 B2
(45) Date of Patent: Dec. 31, 2024

(54) METHOD OF EXTRACTING LITHIUM COMPOUND(S)

(71) Applicant: OUTOTEC (FINLAND) OY, Espoo (FI)

(72) Inventor: Marika Tiihonen, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 795 days.

(21) Appl. No.: 16/623,015

(22) PCT Filed: Jun. 22, 2017

(86) PCT No.: PCT/FI2017/050477
§ 371 (c)(1),
(2) Date: Dec. 16, 2019

(87) PCT Pub. No.: WO2018/234614
PCT Pub. Date: Dec. 27, 2018

(65) Prior Publication Data
US 2021/0147247 A1    May 20, 2021

(51) Int. Cl.
*C01D 15/08*    (2006.01)
*C01B 25/32*    (2006.01)
(Continued)

(52) U.S. Cl.
CPC ............ *C01D 15/08* (2013.01); *C01B 25/324* (2013.01); *C01B 25/34* (2013.01); *C22B 3/12* (2013.01); *C22B 3/44* (2013.01)

(58) Field of Classification Search
CPC ....... C01D 15/08; C01B 25/324; C01B 25/34; C22B 3/12; C22B 3/44
(Continued)

(56) References Cited

U.S. PATENT DOCUMENTS

| 3,073,673 A | 1/1963 | Chubb |
| 3,112,171 A | 11/1963 | Archambault |

(Continued)

FOREIGN PATENT DOCUMENTS

| CN | 104220371 A | 12/2014 |
| CN | 104245587 A | 12/2014 |
| WO | 2013140039 A1 | 9/2013 |

OTHER PUBLICATIONS

Ma et al, "Principle on Hydrometallurgy", Beijing: Metallurgical Industry Press, 1st Edition, Sep. 30, 2007, pp. 237-238.
(Continued)

*Primary Examiner* — Melissa S Swain
(74) *Attorney, Agent, or Firm* — Robert P. Michal, Esq.; Carter, DeLuca & Farrell LLP

(57) ABSTRACT

A method and apparatus of preparing lithium compound(s) from lithium-containing mineral includes a) a leaching step, wherein the lithium-containing mineral is leached in aqueous leach solution containing alkaline carbonate, for liberating lithium and phosphate(s) from the lithium-containing mineral, thus obtaining leach slurry containing lithium carbonate and phosphate(s) leach slurry, b) a carbonization step, wherein the leach slurry containing lithium carbonate and phosphate(s), obtained from the leaching step, is reacted with an alkali earth metal compound in the presence of $CO_2$ for obtaining a carbonated slurry containing lithium hydrogen carbonate, and for precipitating phosphate(s) contained in the leach slurry as insoluble phosphate compound(s), c) a solid-liquid separation step, wherein the carbonated slurry obtained from carbonization step is subjected to solid-liquid separation wherein the undissolved mineral and phosphate compound(s) are separated as solids that can be recovered or discarded, thereby obtaining a solution containing lithium hydrogen carbonate.

20 Claims, 1 Drawing Sheet

(51) Int. Cl.
*C01B 25/34* (2006.01)
*C22B 3/12* (2006.01)
*C22B 3/44* (2006.01)

(58) Field of Classification Search
USPC ........................................................ 423/179.5
See application file for complete search history.

(56) References Cited

U.S. PATENT DOCUMENTS

| | | | |
|---|---|---|---|
| 3,343,910 | A | 9/1967 | Archambault et al. |
| 4,124,684 | A | 11/1978 | Olivier et al. |
| 9,255,012 | B2 | 2/2016 | Tiihonen et al. |
| 2015/0071837 | A1 | 3/2015 | Chon et al. |

OTHER PUBLICATIONS

Office Action issued by the China National Intellectual Property Administration in relation to Chinese Application No. 201780092312.1 dated Sep. 16, 2021 (6 pages) along with an English language translation (11 pages).
Choubey, P. K. et al., "Advance review on the exploitation of the prominent energy-storage element: Lithium. Part I: From mineral and brine resources", Minerals Engineering Oxford, GB : Pergamon Press, (Jan. 28, 2016), vol. 89, ISSN 0892-6875, pp. 119-137, XP029442016 [X] 1-15 * Section 2.5. Existing commercial process for lithium recovery from minerals; figure 10 * DOI: <http://dx.doi.org/10.1016/j.mineng.2016.01.010>.
Chen, Y. et al., "Preparation of lithium carbonate from spodumene by a sodium carbonate autoclave process", Hydrometallurgy Amsterdam, (May 14, 2011), vol. 109, ISSN 0304-386X, pp. 43-46, XP028267179 [A] 1-15 * whole document * DOI: <http://dx.doi.org/10.1016/j.hydromet.2011.05.006>.
International Search Report issued by the Finnish Patent and Registration Office acting as the International Searching Authority in relation to PCT/FI2017/050477 dated Oct. 4, 2017 (5 pages).
Written Opinion of the International Searching Authority issued by the Finnish Patent and Registration Office acting as the International Searching Authority in relation to PCT/FI2017/050477 dated Oct. 4, 2017 (7 pages).
International Preliminary Report on Patentability issued by the European Patent Office acting as the International Preliminary Examining Authority in relation to PCT/FI2017/050477 dated Sep. 18, 2019 (5 pages).
"Global Resource Distribution and Potential Analyses of Lithium Minerals", edited by Wang Qiushu et al., Beijing: Geological Publishing House, 1st Edition, p. 42-43, Jun. 30, 2016.
Xu Yunsheng et al., Basic Chemistry, Guangzhou: South China University of Technology, 1st Edition, p. 133, Jun. 30, 2007.
Office Action issued by the China National Intellectual Property Administration in relation to Chinese Application No. 201780092312.1 dated Jun. 7, 2021 English translation only (8 pages).
Search Report issued by the African Regional Intellectual Property Organization (ARIPO) in relation to Original Filing No. AP/P/2019/012112 dated Jul. 1, 2021 (1 page).
Hun et al: "Extraction of lithium salt from spodumene involves roasting spodumene concentrate, cooling, milling, adding alkali, heating, carbonizing, decomposing, centrifuging, washing and drying", WPI / THOMSON . . . vol. 2011, No. 35, Jan. 19, 2011 (Jan. 19, 2011), XP002746033, * the whole document*.
Extended European Search Report issued by the European Patent Office in relation to European Application No. 17915110.5 dated Jan. 19, 2021 (3 pages).
Brazilian Search Report issued by the Federal Public Service Ministry of The Economy National Institute of Industrial Property in relation to Brazilian Application No. BR112019026744-1 dated May 16, 2022 (4 pages).

METHOD OF EXTRACTING LITHIUM COMPOUND(S)

CROSS-REFERENCE TO RELATED APPLICATIONS

This application is a national phase entry under 35 U.S.C. 371 of PCT International Application No. PCT/FI2017/050477 filed Jun. 22, 2017, the disclosure of this application is expressly incorporated herein by reference in its entirety.

FIELD OF THE INVENTION

The present invention relates to a method of extracting lithium compounds from mineral or mineral concentrate.

The demand for lithium and lithium compounds is one of the fastest growing demands in metals resources. Lithium may be extracted from minerals, brine and seawater. The mineral sources containing lithium are spodumene, pentalite and lepidolite.

Minerals and mineral concentrates contain gangue such as phosphorus containing apatite. When targeting to high-purity lithium products or intermediate products, the challenge is often to ensure proper separation of impurities from the lithium product.

One procedure for extracting the lithium from lithium-bearing mineral has been described in WO2007103083A2, which discloses the use of an alkaline material for the extraction, providing a precipitated by-product, while the lithium is solubilized. From this solution, the lithium is then directly precipitated into a carbonate. Such a process will, however, also typically cause the precipitation of impurities together with the lithium carbonate.

US2004/0005267A1 discloses a method for making low sodium lithium carbonate by precipitating lithium carbonate from purified brine using soda ash, filtering to obtain solid lithium carbonate, introducing carbon dioxide gas to react the solid lithium carbonate into the aqueous bicarbonate, from which solid impurities can be separated.

When processing lithium-containing mineral concentrate, such as spodumene concentrate via alkaline carbonate leach processes, it has been observed that phosphoric impurities solubilize and report further to the final lithium carbonate product as insoluble phosphate compounds. Typically the phosphate impurities are compounds with lithium and/or undesired metals. Lithium carbonate is typically processed further to form other lithium chemicals, such as lithium hydroxide. During further processing the presence of phosphoric impurities may lead to lithium losses.

The phosphoric impurities originate typically from gangue minerals of the concentrate, such as apatite. Typical phosphate levels, as elemental P, have been at the range of 500 to 2000 ppm in the final lithium carbonate salts originating from concentrates with less than 0.5% of apatite.

BRIEF DESCRIPTION OF THE INVENTION

One of the disadvantages associated with the prior art arrangements and methods is, that the phosphate(s) present in the gangue minerals are partly dissolved in the lithium (or spodumene) leaching environment and react with lithium and/or undesired compounds forming unwanted lithium phosphate compounds in the desired lithium product, typically in lithium carbonate.

An object of the present invention is thus to provide a method and an arrangement for implementing the method so as to alleviate the above disadvantages of impurities or lithium losses. The objects of the invention are achieved by a method and an arrangement which are characterized by what is stated in the independent claims. The preferred embodiments of the invention are disclosed in the dependent claims.

The invention presents a method for removal of phosphate species as insoluble compounds in a carbonate leach process of lithium-containing mineral, for example lithium-containing concentrate, typically spodumene concentrate. The invention is based on the idea of precipitating phosphate species during the carbonization phase thereby prohibiting the phosphate to react with lithium.

An advantage of the method and arrangement of the invention is that lithium is obtained as a desired product, i.e. as lithium bicarbonate or lithium carbonate, and not as undesired side product formed of impurity phosphates that have reacted with the lithium. With the method and apparatus of the present invention it is possible to achieve lithium carbonate product, which has a phosphorus content less than 300 ppm, more typically less than 200 ppm. Without the present invention the phosphorus content of the end product would be 500-2000 ppm.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1A:
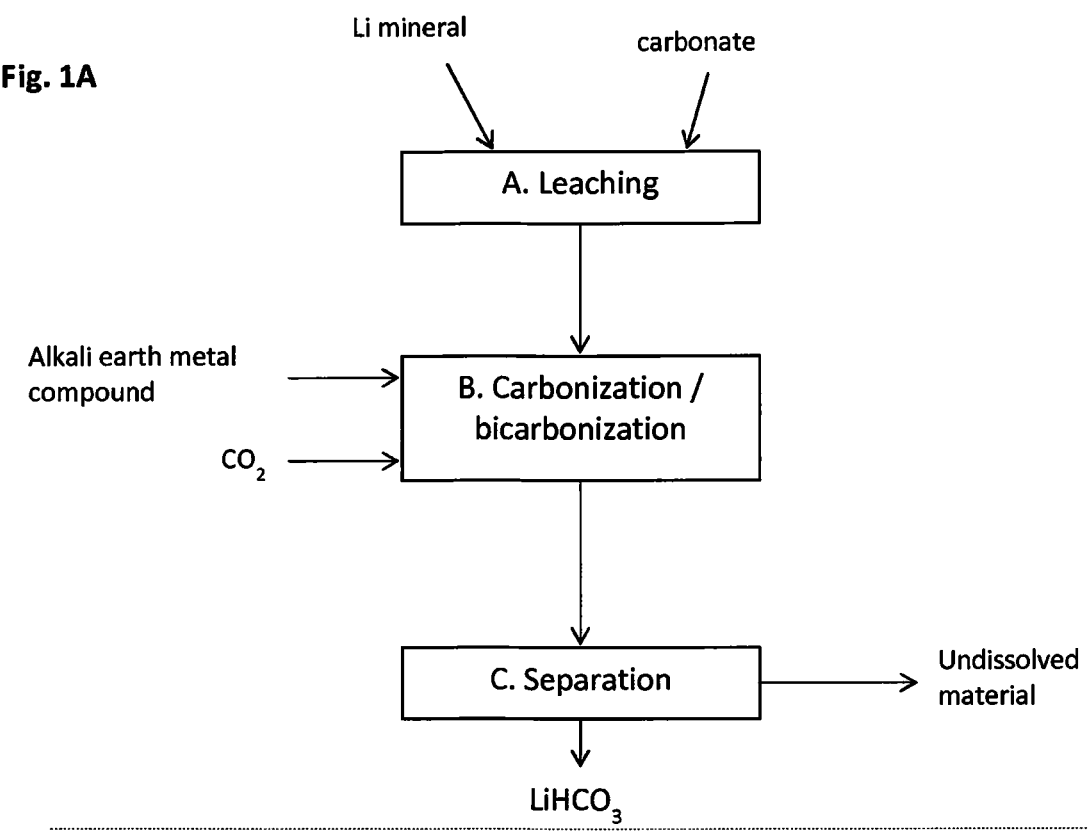
FIG. 1 is a flow diagram of an example embodiment of the present invention.

The invention relates to a method of preparing lithium compound(s), more specifically to a method of preparing one or more types of lithium carbonates, particularly lithium hydrogen carbonate (lithium bicarbonate) and/or lithium carbonate, from a lithium-containing mineral. The method of the invention comprises a) a leaching step, wherein the lithium-containing mineral is leached in aqueous alkaline carbonate leach solution for liberating lithium and phosphate from the mineral, thus obtaining a leach slurry containing lithium carbonate and phosphate, b) a carbonization step, wherein the obtained leach slurry is reacted with an alkali earth metal compound in the presence of $CO_2$, for obtaining a carbonated slurry containing lithium bicarbonate, and for precipitating phosphate(s) from the leach slurry as insoluble phosphate compound(s), c) a solid-liquid separation step, wherein the carbonated slurry obtained from the carbonization step is subjected to solid-liquid separation wherein undissolved mineral and the insoluble phosphate compound(s) are separated as solids that can be recovered or discarded, thereby obtaining a solution containing lithium hydrogen carbonate.

The method can be performed batch wise or continuously.

According to an embodiment of the present invention the lithium containing mineral is processed as lithium-containing concentrate, typically spodumene concentrate. Spodumene concentrate comprises typically 60 to 85 weight-% spodumene ($LiAl(SiO_3)_2$), which includes typically 20 to 40 weight-% silicate. Apatite is a typical gangue mineral of spodumene causing problems for example by providing unwanted ions, such as phosphate ions.

In the leaching step a), the aqueous alkaline carbonate leach solution comprises sodium carbonate and/or potassium carbonate. The leaching step is typically performed at elevated temperature and elevated pressure. Typically the temperature of the leaching step is 150° C. or more, more typically between 150-300° C., most typically between 190-240° C. The pressure is typically not controlled in itself, but it adjusts to the level corresponding to the used temperature.

In the leaching step the phosphate(s) contained in the mineral are partly dissolved and lithium contained in the mineral is liberated, thereby forming a leach slurry. The lithium-containing slurry now contains lithium as lithium carbonate. After the leaching step the solid matter does not contain significant amount of spodumene, i.e. lithium aluminium silicate, since it has transformed to sodium aluminium silicate. In other words, lithium contained in spodumene has been liberated and replaced by sodium originating from the leaching solution. Some of the phosphates contained in the mineral used as starting material have been solubilized. Typically the yield of liberated lithium from the leaching step is 90 to 95 weight-%, calculated from the mineral. However, lithium carbonate is only sparingly solubilized in the leaching step, thus remaining mostly in solid form. Therefore, the solid lithium carbonate obtained from the starting material is transformed to solubilized lithium hydrogen carbonate in the carbonization step in order to be able to separate it from the undesirable, undissolved materials.

According to a preferred embodiment, the leach slurry obtained in the leaching step is carried further to the carbonaization step directly, without any separation steps.

The carbonization step b) is performed in the presence of alkali earth metal compound, or mixture of compounds, and carbon dioxide. The alkali earth metal compound may be added before and/or during the leaching step and/or before and/or during the carbonization step. Preferably the alkali earth metal compound is added already before the leaching step. In this way the feed mixture is ready when fed to the leaching step. Furthermore, the carbonization step is typically performed in an autoclave rendering the addition of chemicals more demanding. Carbon dioxide is typically added during the carbonization step.

Typically, the alkali earth metal compound is selected from the group consisting of alkali earth metal hydroxides, alkali earth metal carbonates, alkali earth metal hydrogen carbonates, and alkali earth metal chlorides, such as magnesium chloride or calcium chloride, more typically the alkali earth metal compound is $Mg(OH)_2$.

The alkali earth metal compound addition can be done as a solution or the compound can be added as aqueous slurry, typically already before and/or during the leaching step. However, typically the alkali earth metal compound is added in solid form.

During the bicarbonization, the alkali earth metal compounds in the leach slurry are solubilized via the reaction with carbon dioxide, and respective hydrogen carbonates are formed. For example, magnesium has a slightly soluble bicarbonate but an insoluble hydrogen phosphate. Hence, the chemical added is solubilized during the bicarbonization allowing simultaneous precipitation of the insoluble hydrogen phosphate species. Typically the insoluble phosphate compound is alkali earth metal hydrogen phosphate, such as magnesium hydrogen phosphate or calcium hydrogen phosphate. However, the insoluble phosphate compound may be any precipitated water-insoluble phosphate compound.

Typically the carbonization step is performed at a temperature between 0-50° C., more typically between 15-40° C. The pressure of the carbon dioxide is typically 1 to 15 bar (g), more typically 1 to 10 bar (g). Higher pressure improves the solubilisation of carbon dioxide into the aqueous solution, but increasing the pressure too much will cause the increased formation of by-products and impurities.

The solid-liquid separation step c) is typically performed by filtering. In the solid-liquid separation step the precipitated phosphate compound(s) are separated together with the undissolved materials from the slurry, resulting in a solution containing lithium hydrogen carbonate. The undissolved material is not separated earlier, since this would result in an increased difficulty to separate the precipitated phosphate species from the solution due to small amount of solid matter.

The present invention relates also to a method for obtaining lithium carbonate, wherein the method comprising steps a) to c) further comprises a crystallization step d), wherein the lithium hydrogen carbonate-containing solution obtained from step c) is heated to decompose bicarbonate and crystallize lithium carbonate. The solution is typically heated to a temperature in the range of 70-100° C.

The present invention also relates to an apparatus suitable for use in the above described methods, the apparatus typically comprising
A. a leaching unit,
B. a carbonization unit, and
C. a separation unit,
optionally also including
D. a crystallization unit.

In the leaching unit A, a step of leaching a mineral or a mineral concentrate using a leach solution can be carried out. Typically the leaching unit A is operated at elevated temperature and elevated pressure. Typically the temperature in the leaching unit A is at least 150° C., more typically between 150-300° C., most typically between 190-240° C. The pressure is typically not controlled in itself, but it adjusts to the level corresponding to the used temperature.

At a downstream point in the leaching unit A, a connection is typically provided to carry the formed slurry directly to an upstream point of the carbonization unit B.

The carbonization unit B is preferably an autoclave and is typically operated at a temperature between 0-50° C., more typically between 15-40° C. The pressure in the carbonization unit B is typically 1 to 15 bar (g), more typically 1 to 10 bar (g).

The solid-liquid separation unit C is typically a filtering unit, such as vacuum belt filter.

The apparatus further comprises necessary connection(s) and storing unit(s) for holding and adding chemicals and removing by-products and impurities, as well as for recycling water, chemicals and/or gases to upstream units.

To facilitate operating the apparatus, it typically also contains means for adjusting the temperature, the pressure, the flow rates and the chemical doses in the different units and connections.

For preparing lithium carbonate, the apparatus may further comprise a crystallization unit D, adapted to heat the lithium hydrogen carbonate-containing solution to decompose bicarbonate and crystallize lithium carbonate. The unit D is typically operated at a temperature between 70-100° C.

LIST OF REFERENCE SIGNS a) Leaching step
b) Carbonization step
c) Solid-liquid separation step
d) Crystallization step (optional)

A Leaching unit
B Carbonization unit
C Separation unit
D Crystallization unit (optional)

Figure 1B:
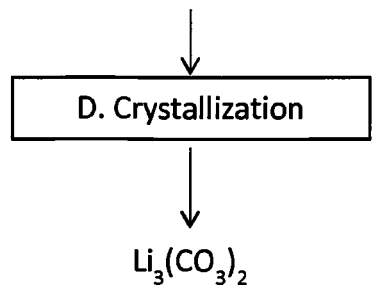

FIG. 1 is a schematic illustration of the method of the present invention, including a FIG. 1A, showing a preferred manner of operating the required steps a) to c), and a FIG. 1B, showing the optional further step d). This method is particularly suitable for preparing lithium hydrogen carbonate from lithium-containing mineral, typically from spodumene concentrate, such as mixture comprising spodumene concentrate and apatite as gangue mineral, and optionally for preparing lithium carbonate.

The method illustrated in FIG. 1 comprises a leaching step A, wherein the lithium-containing mineral is leached in carbonate leach solution, for obtaining a leach slurry. The carbonate leach solution is preferably an aqueous alkaline carbonate solution, such as an aqueous solution of sodium carbonate and/or potassium carbonate. The temperature of the leaching step A is typically 150° C., or more, and the pressure is at a level corresponding to the used temperature. In the leaching step lithium contained in the mineral starting material is liberated into the leach slurry and the phosphate(s) of the mineral are partly solubilized. The obtained phosphate and lithium carbonate-containing leach slurry contains also the undissolved part of the mineral.

After the leaching step a), the method comprises a carbonization step b), leach slurry obtained from the leaching step a) is reacted with an alkali earth metal compound, added before and/or during this step and/or already before and/or during the leaching step a). Carbon dioxide ($CO_2$) is also added, thus obtaining lithium hydrogen carbonate, and also causing precipitation of phosphates, contained in the lithium carbonate-containing slurry, as insoluble phosphate compound(s).

The alkali earth metal compound may thus be added before and/or during the leaching step a), and/or before and/or during the carbonization step b). If added at two or more points, it is possible to use either the same alkali earth metal compound, or two or more different compounds, to achieve variation of the reaction conditions.

According to a preferred embodiment, an alkali earth metal compound is added to the leaching slurry, before the leaching process has started, while the same or another alkali earth metal compound is added also before the carbonization step b), at a point before adding the carbon dioxide feed.

For solubilizing the $CO_2$ present in the carbonization step, the temperature of the carbonization step is lowered, typically to be in the range of 0-50° C., more typically between 15 to 40° C. The pressure of the carbon dioxide is typically 1 to 15 bar g, more typically 1 to 10 bar g. A slurry containing lithium hydrogen carbonate, insoluble phosphate compound(s) and undissolved mineral is obtained from the carbonization step b) and subjected to solid-liquid separation step c), wherein the undissolved mineral and precipitated insoluble phosphate compound(s) are separated from a solution containing lithium hydrogen carbonate. The solid-liquid separation step c) is typically a filtering step, such as a vacuum belt filtering.

The solution containing lithium hydrogen carbonate obtained from the solid-liquid separation step c) may be optionally subjected to a crystallization step d), wherein the solution is heated to decompose bicarbonate and to obtain crystallized lithium carbonate. The temperature is typically in the range of 70 to 100° C.

EXAMPLES

Firstly, two test series were performed, wherein phosphate was precipitated from $LiHCO_3$-containing solution. The used chemicals were $CaCl_2$) and $MgCl_2$, as they are soluble and have no effect on the pH value of the solution. The chemicals were added to the $LiHCO_3$-solution after bicarbonization. Chloride ion acted as an inert anion in the test environment. The tested chloride chemicals were added in a stoichiometric amount or twice the stoichiometric amount with respect to the amount of phosphorus in the starting material. The results are shown in the below Table 1.

Secondly, solid $Mg(OH)_2$ was added to a batch of mineral slurry before carbonization, together with spodumene concentrate (containing 4.5% $Li_2O$), solid $Na_2CO_3$ (1.1×equivalent to the lithium content of the concentrate) and water to make a 20 w % slurry. The slurry was leached in an autoclave at 220° C. for one hour. After the leaching step, the slurry was cooled down to 25° C. and gaseous $CO_2$ was injected to the slurry at $CO_2$ pressure 3 bar g for 30 minutes. Afterwards a solid/liquid (S/L) separation by filtering was carried out. Solution analysis from the filtrate was taken and the contents of lithium, calcium, magnesium and phosphorus (Li, Ca, Mg & P) were analyzed with ICP-OES. $Mg(OH)_2$ addition was 2×stoichiometric amount to the soluble P determined in an earlier parallel leach test without the addition of $Mg(OH)_2$ (assuming $MgHPO_4$ precipitation). A parallel test was made without the addition of $Mg(OH)_2$ in order to determine the levels of soluble phosphorus and Ca & Mg originating from the concentrate. These results are also shown in Table 1.

TABLE 1

The results of the different test series described above.

| | Li g/l | Mg mg/l | Ca mg/l | P mg/l |
|---|---|---|---|---|
| Phosphate precipitation tests for LiHCO3 solution | | | | |
| Initial concentration (soln.) | 5.5 | 0.5 | 6 | 22 |
| Dosage (CaCl2) 1 x eq. | 5.5 | | 10 | 22 |
| Dosage (CaCl2) 2 x eq. | 5.5 | | 11 | 22 |
| Dosage (MgCl2) 1 x eq. | 5.5 | 19 | | 22 |
| Dosage (MgCl2) 2 x eq. | 5.5 | 40 | | 22 |
| Phosphate precipitation for LIHCO3 - mineral slurry in spodumene leaching-carbonation test | | | | |
| No Mg(OH)2 addition | 4 | 0.5 | 6 | 23 |
| Dosage (Mg(OH)2) 2 x eq. | 5.4 | <1 | 1 | 3.5 |

It will be obvious to a person skilled in the art that, as the technology advances, the inventive concept can be implemented in various ways. The invention and its embodiments are not limited to the examples described above but may vary within the scope of the claims.

The invention claimed is:

1. A method of preparing one or more types of lithium compounds from lithium-containing mineral, wherein the method comprises:
   a) a leaching step, wherein a feed mixture containing the lithium-containing mineral is leached in aqueous alkaline carbonate leach solution, for liberating lithium compounds and phosphate(s) from the lithium-containing mineral, thus obtaining a leach slurry containing lithium carbonate and phosphate(s);
   b) a carbonization step, wherein the obtained leach slurry is reacted with an alkali earth metal compound in the presence of $CO_2$, for obtaining a carbonated slurry containing lithium hydrogen carbonate, and for precipitating phosphate(s) from the leach slurry as insoluble phosphate compound(s); and c) a solid-liquid separation step, wherein the carbonated slurry obtained from the carbonization step is subjected to solid-liquid separation, wherein undissolved mineral and the insoluble phosphate compound(s) are separated as solids that can be recovered or discarded, thereby obtaining a solution containing lithium hydrogen carbonate, which optionally may be crystallized to lithium carbonate, whereby the alkali earth metal compound is added before the leaching step, in order to have the feed mixture ready when fed to the leaching step, and adding carbon dioxide during the carbonization step.

2. The method according to claim 1, wherein the lithium containing mineral is used in the form of lithium-containing concentrate.

3. The method according to claim 1, wherein the alkaline carbonate leach solution comprises sodium carbonate and/or potassium carbonate.

4. The method according to claim 1, wherein the leaching step is performed at elevated temperature and elevated pressure.

5. The method according to claim 1, wherein the temperature of the leaching step is 150° C. or more.

6. The method according to claim 1, wherein the alkali earth metal compound is added before and/or during the leaching step and/or before and/or during the carbonization step.

7. The method according to claim 1, wherein the alkali earth metal compound is selected from the group consisting of alkali earth metal hydroxide(s), alkali earth metal carbonate(s), alkali earth metal hydrogen carbonate(s), and alkali earth metal chloride(s).

8. The method according to claim 1, wherein the carbonization step is performed at temperature between 0-50° C.

9. The method according to claim 1, wherein the solid-liquid separation step is performed by filtering.

10. The method according to claim 1, wherein the method further comprises a crystallization step d), wherein the lithium hydrogen carbonate-containing solution is heated to decompose bicarbonate and to crystallize lithium carbonate.

11. The method according to claim 1, wherein the method is performed batch wise or continuously.

12. The method according to claim 1, further comprising a preparing step, wherein crystallized lithium carbonate is prepared.

13. The method according to claim 1, wherein the lithium containing mineral is used in the form of spodumene concentrate.

14. The method according to claim 1, wherein the temperature of the leaching step is between 150-300° C.

15. The method according to claim 1, wherein the temperature of the leaching step is between 190-240° C.

16. The method according to claim 1, wherein the carbonization step is performed at temperature between 15 to 40° C.

17. The method according to claim 1, wherein the solid-liquid separation step is performed by vacuum belt filtering.

18. A method of preparing one or more types of lithium compounds from lithium-containing mineral, wherein the method comprises:

a) a leaching step, wherein a feed mixture containing the lithium-containing mineral is leached in aqueous alkaline carbonate leach solution, for liberating lithium compounds and phosphate(s) from the lithium-containing mineral, thus obtaining a leach slurry containing lithium carbonate and phosphate(s);

b) a carbonization step, wherein the obtained leach slurry is reacted with an alkali earth metal compound in the presence of $CO_2$, for obtaining a carbonated slurry containing lithium hydrogen carbonate, and for precipitating phosphate(s) from the leach slurry as insoluble phosphate compound(s), wherein the insoluble phosphate compound(s) includes alkali earth metal hydrogen phosphate, magnesium hydrogen phosphate, and/or calcium hydrogen phosphate; and c) a solid-liquid separation step, wherein the carbonated slurry obtained from the carbonization step is subjected to solid-liquid separation, wherein undissolved mineral and the insoluble phosphate compound(s) are separated as solids that can be recovered or discarded, thereby obtaining a solution containing lithium hydrogen carbonate, which optionally may be crystallized to lithium carbonate, whereby the alkali earth metal compound is added before the leaching step, in order to have the feed mixture ready when fed to the leaching step, and adding carbon dioxide during the carbonization step.

19. A method of preparing one or more types of lithium compounds from lithium-containing mineral, wherein the method comprises:

a) a leaching step, wherein a feed mixture containing the lithium-containing mineral is leached in aqueous alkaline carbonate leach solution, for liberating lithium compounds and phosphate(s) from the lithium-containing mineral, thus obtaining a leach slurry containing lithium carbonate and phosphate(s);

b) a carbonization step, wherein the obtained leach slurry is reacted with an alkali earth metal compound in the presence of $CO_2$, for obtaining a carbonated slurry containing lithium hydrogen carbonate, and for precipitating phosphate(s) from the leach slurry as insoluble phosphate compound(s), wherein the alkali earth metal compound is $Mg(OH)_2$; and c) a solid-liquid separation step, wherein the carbonated slurry obtained from the carbonization step is subjected to solid-liquid separation, wherein undissolved mineral and the insoluble phosphate compound(s) are separated as solids that can be recovered or discarded, thereby obtaining a solution containing lithium hydrogen carbonate, which optionally may be crystallized to lithium carbonate, whereby the alkali earth metal compound is added before the leaching step, in order to have the feed mixture ready when fed to the leaching step, and adding carbon dioxide during the carbonization step.

20. The method according to claim 19, wherein the $Mg(OH)_2$ is in solid form.

* * * * *